United States Patent
Azzouni (10) Patent No.: US 11,028,561 B2
(45) Date of Patent: Jun. 8, 2021

(54) MANAGING STORAGE OF WATER

(71) Applicant: Saudi Arabian Oil Company, Dhahran (SA)

(72) Inventor: Suliman M. Azzouni, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 171 days.

(21) Appl. No.: 16/037,023

(22) Filed: Jul. 17, 2018

(65) Prior Publication Data

US 2020/0024833 A1    Jan. 23, 2020

(51) Int. Cl.
| | |
|---|---|
| *B65G 5/00* | (2006.01) |
| *E21B 47/00* | (2012.01) |
| *E03B 3/06* | (2006.01) |
| *E03B 3/03* | (2006.01) |
| *E03B 11/14* | (2006.01) |
| *E03F 5/10* | (2006.01) |
| *G06Q 10/06* | (2012.01) |

(52) U.S. Cl.
CPC .................. *E03B 3/06* (2013.01); *B65G 5/00* (2013.01); *E03B 3/03* (2013.01); *E03B 11/14* (2013.01); *E03F 5/10* (2013.01); *E21B 47/00* (2013.01); *G06Q 10/06* (2013.01)

(58) Field of Classification Search
CPC .............................. E21B 41/0057; B65G 5/00
See application file for complete search history.

(56) References Cited

U.S. PATENT DOCUMENTS

| | | | | |
|---|---|---|---|---|
| 2,773,236 | A | * | 12/1956 | Martin .................. E21B 47/102 324/325 |
| 3,436,754 | A | * | 4/1969 | Powner ............... H03M 7/4025 341/66 |
| 4,214,628 | A | * | 7/1980 | Botts ....................... E21B 43/20 166/90.1 |

(Continued)

FOREIGN PATENT DOCUMENTS

| | | |
|---|---|---|
| EP | 2 907 966 A2 | 8/2015 |
| WO | WO-2005/026053 A2 | 3/2005 |
| WO | WO-2020/016640 A1 | 1/2020 |

OTHER PUBLICATIONS

International Search Report for PCT/IB2018/057647, 6 pages (dated Apr. 9, 2019).

(Continued)

*Primary Examiner* — Giovanna Wright
(74) *Attorney, Agent, or Firm* — Choate, Hall & Stewart LLP; Jialan Zhang; Peter A. Flynn (57) ABSTRACT

An example system is configured to manage the storage of water underground using a sensor-based grid system. The example system includes wells, each of which is between a surface and an underground formation capable of storing water received from the surface. The example system includes pumps, at least of which is associated with each well to force water from the surface, through the well, into the underground formation. The example system includes sensors, at least of which is associated with each well. The sensors are configured to communicate sensor data wirelessly. The example system also includes a computing system configured to receive sensor data from each of the sensors and to control operations of one or more of the pumps based on the sensor data.

24 Claims, 5 Drawing Sheets

(56) References Cited

U.S. PATENT DOCUMENTS

| | | | |
|---|---|---|---|
| 2001/0052774 A1 | 12/2001 | Rossi et al. | |
| 2005/0186030 A1* | 8/2005 | Peters | E03B 11/14 |
| | | | 405/53 |
| 2008/0190604 A1* | 8/2008 | Hild | E21B 47/0007 |
| | | | 166/250.15 |
| 2009/0173142 A1 | 7/2009 | Peters et al. | |
| 2009/0211755 A1 | 8/2009 | Dyer et al. | |
| 2010/0147511 A1 | 6/2010 | Ollre | |
| 2017/0212484 A1* | 7/2017 | Potucek | H04L 61/2007 |
| 2017/0254171 A1 | 9/2017 | Cleven | |
| 2018/0231431 A1* | 8/2018 | Minns | G01V 3/06 |
| 2019/0077603 A1* | 3/2019 | Fabbri | B65G 5/005 |

OTHER PUBLICATIONS

Written Opinion for PCT/IB2018/057647, 7 pages (dated Apr. 9, 2019).

Alyamani, M. and Sen, Z., Regional Variation of Monthly Rainfall Amounts in the Kingdom of Saudi Arabia, KAU—Scientific Publishing Center, Food and Agriculture Organization of the United Nations, 2 pages (1993). URL: http://agris.fao.org/agris-search/search.do?recordID=AV20120157219 [Retrieved Aug. 21, 2018].

Ground Water Protection Council, Injection Wells, An Introduction to Their Use, Operation and Regulation, Brochure, 16 pages (20015).

Hohner, S.M. et al., Modeling Aquifer Recharge with GIS, Submitted for inclusion in the record of proceedings of Geoinformatics '96, Manuscript, WRE #335, 7 pages (Feb. 1996).

Lacombe, P.J., Artificial Recharge of Ground Water by Well Injection For Storage and Recovery, Cape May County, New Jersey, 1958-92, U.S. Geological Survey, Open-File Report 96-313, 34 pages (1996).

Mccurdy, R., Underground Injection Wells for Produced Water Disposal—Hydraulic Fracturing Technical Workshop 4, Chesapeake Energy Corporation, 34 pages (last updated Oct. 27, 2016).

Rafferty, K., Specification of Water Wells, ASHRAE Transactions: Symposia, CI-01-3-3, 107(2): 487-493 (2001).

Rigzone, How Does Water Injection Work?, URL: http://www.rigzone.com/training/insight.asp?insight_id=341[Retrieved Sep. 27, 2017].

WaterAid in Nepal, Rainwater harvesting for recharging shallow groundwater, Report, 48 pages (Sep. 2011).

International Preliminary Report on Patentability for PCT/IB2018/057647, 17 pages (dated Mar. 13, 2020).

* cited by examiner

MANAGING STORAGE OF WATER

TECHNICAL FIELD

This specification is directed to managing the storage of water underground using a sensor-based grid system.

BACKGROUND

In arid climates, in particular, rainfall can be limited to a few months of the year. During those months, storms can drop more water than the ground is capable of absorbing. As a result, water can accumulate on the ground, sometimes in large quantities. If the accumulation occurs in a residential area, the water may be moved to empty land. There, it can become a long-term hazard. For example, the standing water may become a breeding ground for mosquitos, which can carry deadly viruses.

SUMMARY

An example system is configured to manage the storage of water underground using a sensor-based grid system. The example system includes wells, each of which is between a surface and an underground formation capable of storing water received from the surface. The example system includes pumps, at least one of which is associated with each well to force water from the surface, through the well, into the underground formation. The example system includes sensors, at least one of which is associated with each well. The sensors may be configured to communicate sensor data wirelessly. The example system also includes a computing system configured to receive sensor data from each of the sensors and to control operations of one or more of the pumps based on the sensor data. The example system may include one or more of the following features, either alone or in combination.

The sensors may be configured to detect a depth of water at a location of a well. The sensor data may represent the depth of the water. The computing system may be configured to control a rate of operation of the one or more pumps based on this sensor data. The sensors may be configured to detect a rate of rainfall at a location of a well. The sensor data may represent the rate of rainfall. The computing system may be configured to control a rate of operation of the one or more pumps based on this sensor data. The sensors may be configured to detect a temperature at a location of a well. The sensor data may represent the temperature. The computing system may be configured to control a rate of operation of the one or more pumps based on this sensor data. The sensors may be configured to detect a wind speed at a location of a well. The sensor data may represent the wind speed. The computing system may be configured to control a rate of operation of the one or more pumps based on the wind speed.

The sensors may be configured to detect one or more of the following: a depth of water at a location of a well, a rate of rainfall at the location of the well, a temperature at the location of the well, or a wind speed at the location of the well. The sensor data may represent one or more of the following: the depth of water at the location of a well, the rate of rainfall at the location of the well, the temperature at the location of the well, or the wind speed at a location of the well. The computing system may be configured to control a rate of operation of the one or more pumps based on this sensor data.

The computing system may be configured to receive meteorological data. The computing system may be configured to control operations of one or more of the pumps based also on the meteorological data. The computing system may be configured to control a rate of operation of one or more of the pumps to pump water at greater rates for wells that are subjected to greater amounts of groundwater exposure than for wells that are subjected to lesser amounts of groundwater exposure. The computing system may be configured to estimate a level of fill of the underground formation, and to control the one or more pumps to force water into parts of the underground formation that are at or below a predefined level of fill.

The underground formation may include a lost circulation zone. The computing system may be configured to identify the lost circulation zone based on geological data representing at least an area of the lost circulation zone.

The example system may include one or more conduits between two or more of the wells. The one or more conduits being may be connected to one or more of the pumps and may be configured to transport water. The computing system may be configured to control a pump to transport water through a conduit from a first well to a second well. The computing system may be configured to control operations of two or more pumps differently based on sensor data received from the two or more pumps or sensor data received from wells associated with the two or more pumps.

The computing system may include memory and one or more processing devices. The one or more processing devices may be configured to store, in memory, a record of water pumped for each well and a record of rainfall in a vicinity of each well. The computing system and the one or sensors may define a grid over an area containing the wells. Controlling operation of pumps within the grid may include coordinating operation of the pumps to regulate storage of groundwater within the underground formation and other underground formations.

An example method includes managing the storage of water underground using a sensor-based grid system. The example method includes detecting environmental conditions in vicinities of wells using sensors associated with respective wells. Each well is between a surface and an underground formation capable of storing water received from the surface. The example method also includes coordinating operation of pumps associated with respective well based on the environmental conditions detected. Each pump may be configured to force water from a surface, through a well, to an underground formation.

The environmental conditions may include a depth of water at a location of a well. Coordinating operation of pumps may include controlling a rate of operation of one or more pumps based on the depth of water. The environmental conditions may include a rate of rainfall at a location of a well. Coordinating operation of pumps may include controlling a rate of operation of one or more pumps based on the rate of rainfall. The environmental conditions may include a temperature at a location of a well. Coordinating operation of pumps may include controlling a rate of operation of one or more pumps based on the temperature. The environmental conditions may include a wind speed at a location of a well. Coordinating operation of pumps may include controlling a rate of operation of one or more pumps based on the wind speed.

The environmental conditions may include more of the following: a depth of water at a location of a well, a rate of rainfall at the location of the well, a temperature at the location of the well, or a wind speed at the location of the well. Coordinating operation of pumps may include controlling a rate of operation of one or more pumps based on more of the following: the depth of water at the location of the well, the rate of rainfall at the location of the well, the temperature at the location of the well, or the wind speed at the location of the well.

The underground formation may include a lost circulation zone. The method may include identifying the lost circulation zone based on geological data representing at least an area of the lost circulation zone.

Operation of the pumps may be coordinated also based on the meteorological data for vicinities of the pumps. Operation of the pumps may be coordinated to control a rate of operation of one or more of the pumps to pump water at greater rates for wells that are subjected to greater amounts of groundwater exposure than for wells that are subjected to lesser amounts of groundwater exposure.

The example method may include estimating a level of fill of the underground formation. Operation of the pumps may be coordinated to control one or more pumps to force water into parts of the underground formation that are at or below a predefined level of fill. Operation of the pumps may be coordinated to force water through one or more conduits between two or more of the wells.

The example method may include storing, in computer memory, a record of water pumped for each well and a record of rainfall in a vicinity of each well.

Any two or more of the features described in this specification, including in this summary section, may be combined to form implementations not specifically described in this specification.

At least part of the processes, methods, systems, and techniques described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, random access memory, and the like. At least part of the processes, methods, systems, and techniques described in this specification may be controlled using a computing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

Like reference numerals in different figures indicate like elements.

DETAILED DESCRIPTION

Described in this specification are example systems for managing the storage of water in underground formations. In an example, ground water may accumulate due to rain storms or flooding. The example systems store this ground water in underground formations for later use. This can be particularly beneficial in arid climates where rainfall is limited and access to fresh water is needed for a growing population. To regulate the storage of ground water, the example systems employ a sensor-based grid system. The sensor-based grid system includes sensors configured to detect environmental conditions in a geographic area that is susceptible to accumulations of ground water. Sensor readings are used to coordinate operation of pumps to pump ground water through wells and into underground formations, such as lost circulation zones or aquifers, for later use.

An example system includes multiple wells, each of which is between the surface and an underground formation capable of storing ground water received from the surface. One or more pumps is associated with each well, and is configured to force ground water from the surface, through the well, into the underground formation. There, the water may be stored for future use. One or more sensors is associated with each well, with each pump, or with both each well and each pump. The sensors are configured to detect environmental or operational conditions at an area of the well. For example, the sensors may be configured to detect conditions, such as the depth of ground water at a location of the well, the rate of rainfall at the location of the well, the outside temperature at the location of the well, or the wind speed at the location of the well. The sensors communicate sensor data representing one or more of these conditions to a computing system. The computing system is configured—for example, programmed—to receive the sensor data from each of the sensors and to coordinate operations of the pumps based on the sensor data. For example, the computing system may control some pumps to operate at a greater rate than other pumps. In an example, if one area is experiencing heavy rainfall, pumps in that area may be controlled to operate at a greater rate than pumps in another area experiencing lighter rainfall.

The sensors and the computing system together constitute a sensor-based grid system for managing the storage of ground water over a geographic area. In some cases, the geographic area may be localized. For example, the geographic area may span kilometers, for example 1000 square kilometers. In some cases, the geographic area may span an entire country. Generally, the sensor-based grid system may be used to manage the storage of water over any appropriate geographic area. The computer system may include a single computer or multiple networked computers, such as servers, as described in this specification.

Figure 1:
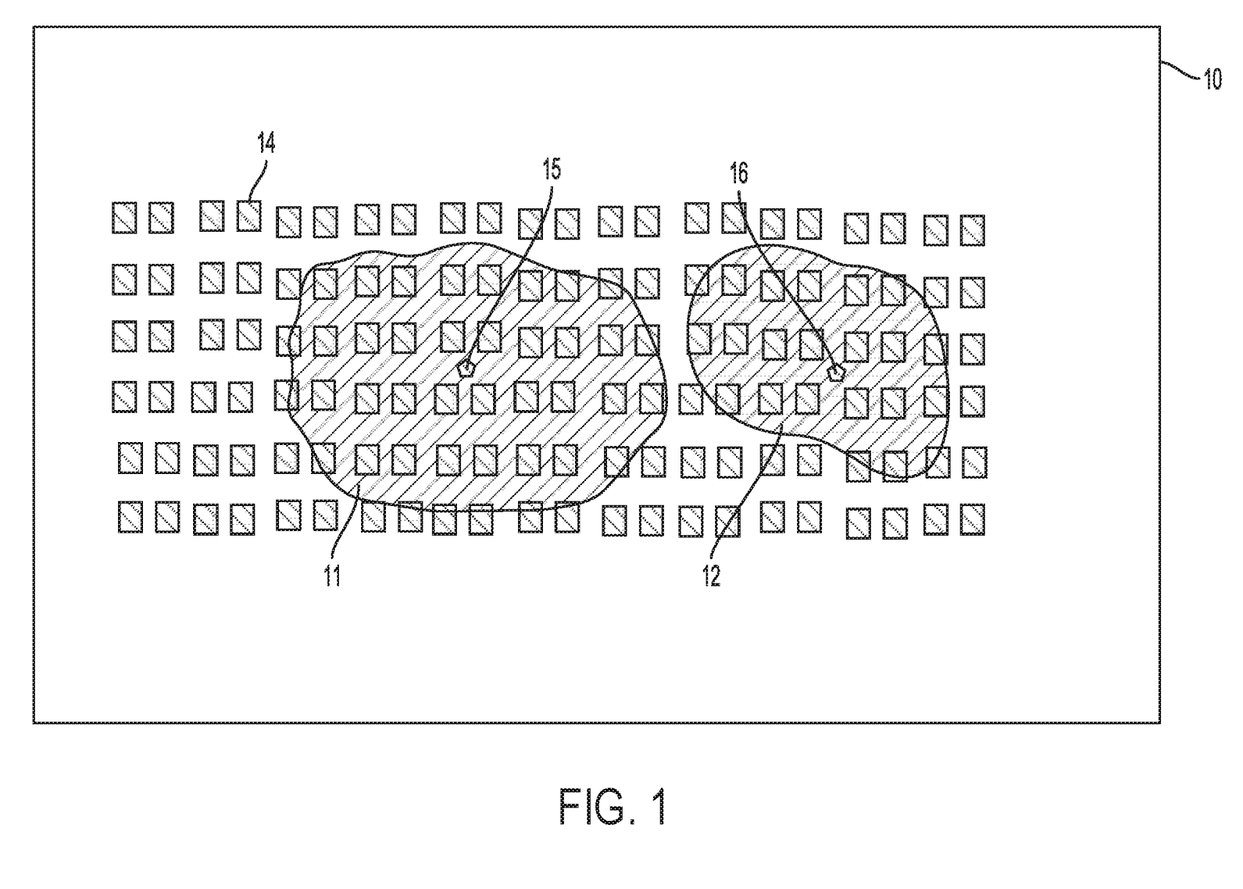
FIG. 1 is block diagram of an example zone containing ground water that has accumulated in pools.

FIG. 1 shows an example area 10 containing ground water that has accumulated in pools 11 and 12. In this example, the pools are located in a residential area containing houses 14. The ground water may accumulate as a result of heavy rains that produce water that cannot be absorbed into the ground. In some examples, the ground water may be a result of overflow of streams, rivers, or other sources of water. The ground water may be fresh water, which can be used for purposes such as irrigation or drinking. In some implementations, the ground water may be salt water, and may be stored simply to remove it from the ground.

Zones that are susceptible to flooding, such as the areas containing ground water pools 11 and 12, may be identified prior to drilling. For example, historical rainfall and flooding records may be examined for a geographical area. A geographical area may be a relatively small area, such as a neighborhood, town, or city, or a relatively large area such as a province or an entire country. The records may be stored in one or more databases that are accessible to a computing system. The computing system may determine, based on these records, that certain areas, such as low-lying areas, are susceptible to flooding. Accordingly, water injection wells 15 and 16 may be drilled in these areas or near to these areas.

The number and sizes of the wells for each area may be based on various factors. For example, the number of wells used may be based on the geographic extent of the area. Larger geographic areas may require more wells or higher-capacity wells, whereas smaller geographic areas may require fewer wells or lower-capacity wells. The number of wells may be based on volumes of water that have historically been present during flood conditions. Larger volumes of water may require more wells or higher-capacity wells, whereas smaller volumes of water may require fewer wells or lower-capacity wells. The number of wells may be based on rainfall records over a period of time for an area. For example, areas that have a history of higher rainfall may require more wells or higher-capacity wells, whereas areas that have a history of lower rainfall may require fewer wells or lower-capacity wells. In general, any appropriate factors may be taken into consideration when determining the number, types, and placement of wells in a zone.

Each of the wells may be drilled to an underground formation for storing the ground water. In some cases, different wells may be drilled to reach the same underground formation. In some cases, different wells may be drilled to reach different underground formations. The number of wells that a formation can accommodate may be based on a various factors. For example, formations that can hold larger amounts of water may support a greater number of wells than formations that can hold lesser amounts of water. For example, formations that extend under larger geographic areas may support a greater number of wells than formations that extend under smaller geographic areas.

Examples of formations to which wells may extend include, but are not limited to, aquifers and lost circulation zones. An aquifer includes permeable rock capable of holding water. In some cases, an aquifer may already contain water, and may be designated for a particular use, such as irrigation or drinking water. In some cases, an aquifer may be reserved for use by a particular geographic area or subdivision. A lost circulation zone in a well is a region in a subterranean formation that inhibits, or prevents, return of mud, fluid, or other materials. There can be various causes for lost circulation zones. In some cases, the formation may be highly permeable and have a less-than-normal hydrostatic pressure. In some cases, the formation may contain faults, such as fractures, into which fluid or other materials escapes, thereby interrupting the circulation into, and out of, the wellbore.

The formations may be identified based, for example, on geological data representing the formation. The geological data may be known beforehand based on prior drilling or site surveys. Known formations that are relatively close to the surface may be advantageous because the wells drilled need not be as deep as for formations at greater depths. Known formations that have relatively low hydrostatic pressures may be advantageous because less pressure may be required to force water from the surface, through the well, into the underground formation. Lost circulation zones that are known not to contain hydrocarbons may be advantageous because the water stored in there will likely not be contaminated. Lost circulation zones that are known to be empty may be advantageous for this same reason.

In some cases, there may be environmental concerns with injecting ground water into an aquifer. For example, if the ground water contains chemicals or exceeds a certain salinity, it may not be desirable to inject that ground water into an aquifer used for drinking water. Accordingly, environmental considerations may be taken into account when determining whether to drill wells into an existing aquifer. In addition, licenses for water use may also be taken into account when determining whether to drill wells into an existing aquifer. This information may be obtained through public records, and used in determining where to drill a well.

The capacities of known formations, such aquifers and lost circulation zones, may also be a factor in determining the number, types, and locations of wells to drill in a geographic area. For example, larger capacity formations may support greater volumes of water than smaller capacity formations. Larger capacity formations may support more wells, higher volume wells, or both, than lower capacity formations.

The placement and distribution of water injection wells may thus be based on the information described previously including, but not limited to, the locations of flood zones, expected volumes of ground water, locations of formations into which to store the ground water, and environmental factors. After the locations are determined, appropriate water injection wells may be drilled at those locations. As described subsequently, the water injection wells are connected in a sensor-based grid system to coordinate their operation to store ground water underground.

Figure 2:
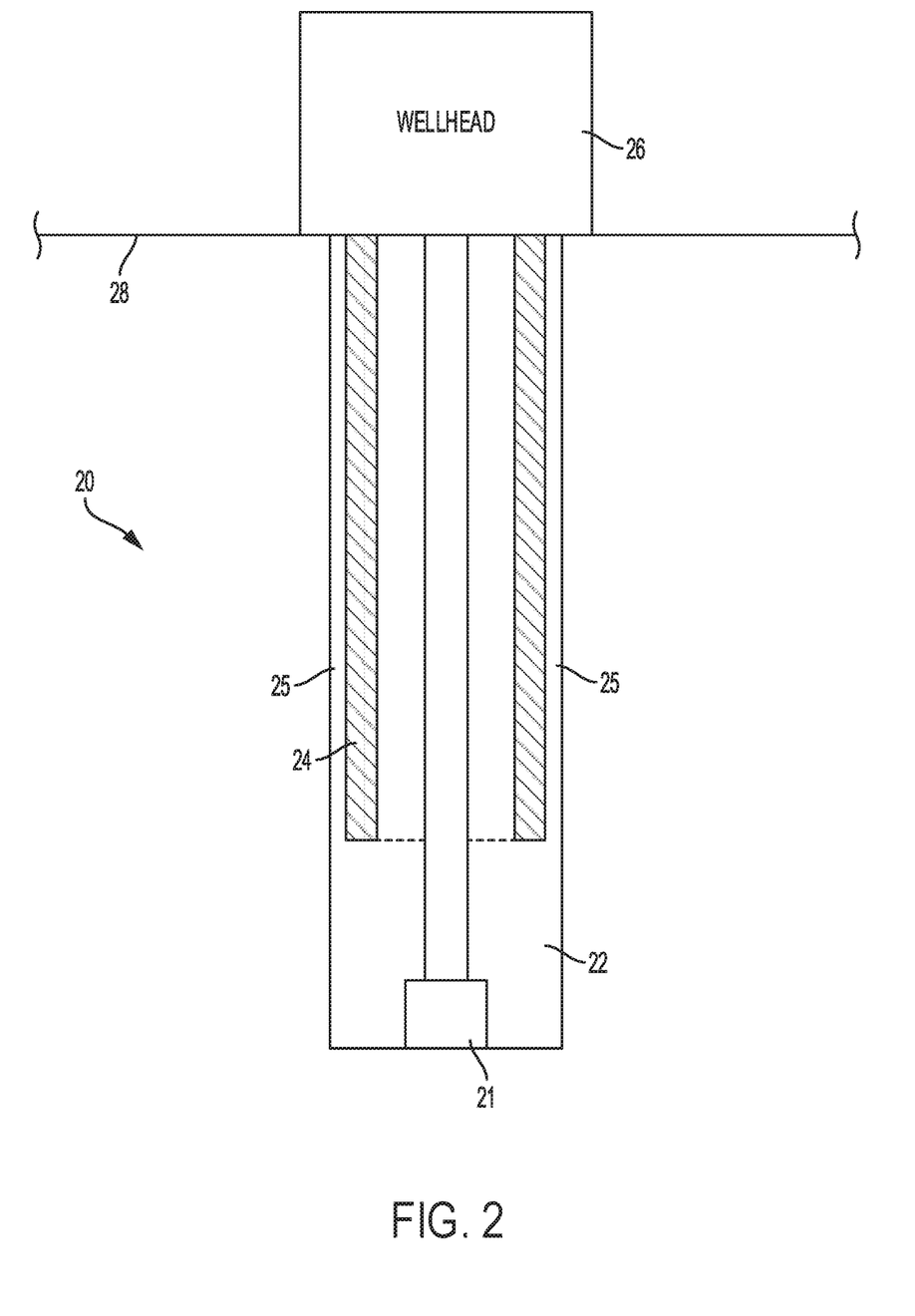
FIG. 2 is a cut-away, side view of an example well.

In some examples, a water injection well may be drilled using rigs used to drill water wells. In some examples, maintenance of the wells is rig-less, which reduces cost and complexity. In some examples, the space needed for drilling each well is relatively small, and may be on the order of a 20 meter (M) by 20M ground plot. In some implementations, a well may contain one, two, or more casing segments that are cemented in place. Referring to FIG. 2, for example, to produce a well 20, a drill 21 bores through earth, rock, and other materials to form a wellbore 22. Part of the production process includes incorporating a casing 24 into the wellbore. The casing supports the sides of the wellbore, and protects components of the well from outside contaminants. The casing may be cemented in place at outer diameter 25, and the cement may be allowed to harden as part of the formation process. The casing may include, among other things, nested casing segments, and components or other structures to support the nested casing segments. The combination of segments is called a casing string. The example of FIG. 2 shows a single casing, not nested casing segments, although nested casing segments may be used. In the example of FIG. 2, the casing is connected to a wellhead 26 at surface 28. In cases where nested casing segments are used, each downhole casing segment, or hanger, is suspended from an immediately-preceding uphole casing segment.

As described previously, well 20 extends into a subterranean formation in which ground water is to be stored. On the surface—for example, at the wellhead—one or more pumps are configured and controllable to force water from the surface, through the well, into the underground formation. In an example, each pump may be a water pump that is run using diesel electric generation. The pump may suction water from a localized area that is lowest in elevation and in proximity to a well. As a result, the amount of standing water left on the surface may be reduced.

Figure 3:
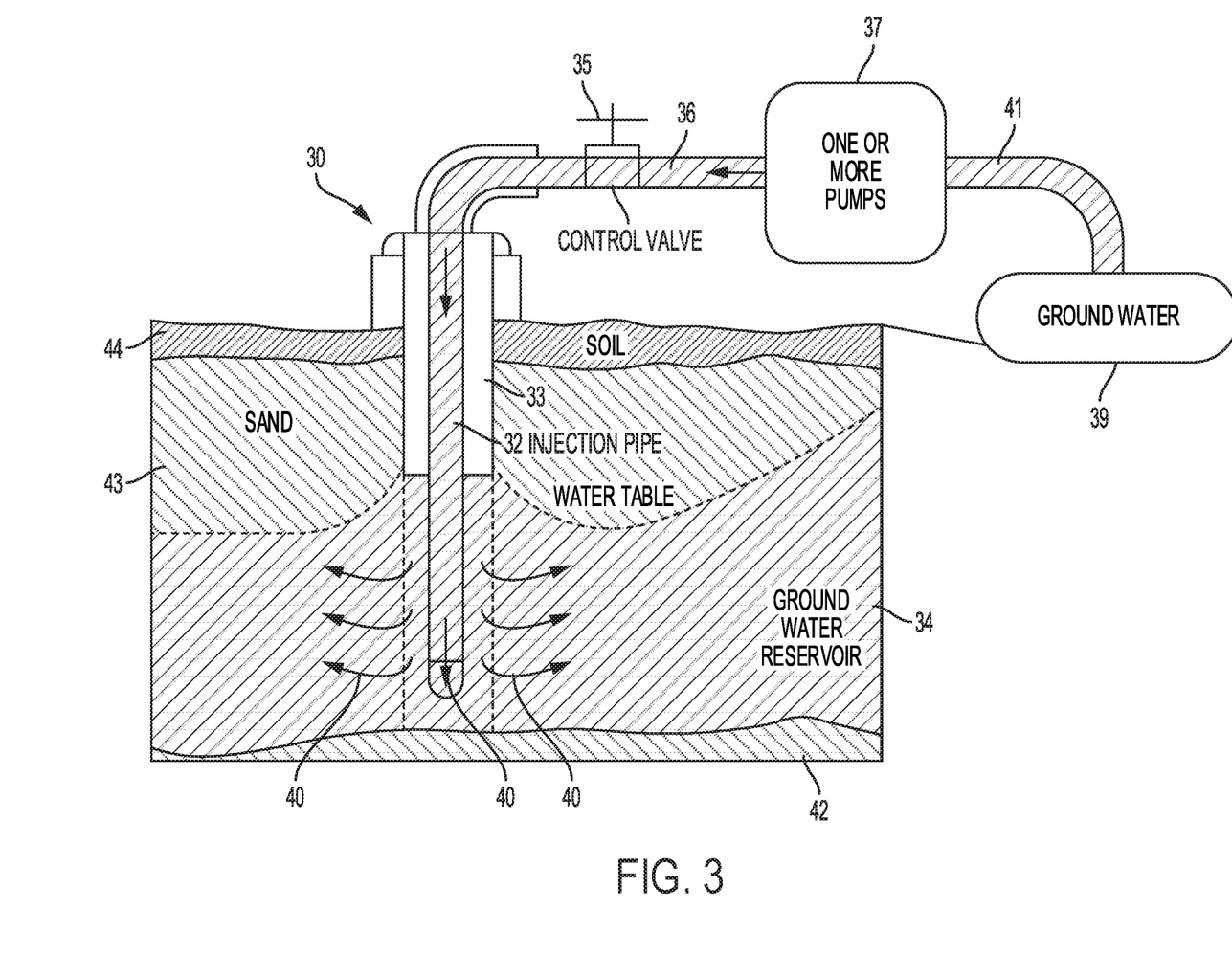
FIG. 3 is a cut-away side view of an example well extending to a formation that functions as a ground water reservoir.

FIG. 3 shows an example of a water injection well 30, which may, but need not, have the structure of well 20 of FIG. 2. Well 30 may be used in one or more areas of a sensor-based grid system. As shown in FIG. 3, well 30 includes an injection pipe 32, which may be run through casing 33 into a subterranean formation 34 that is capable of storing water. In this example, the subterranean formation is an aquifer that already contains at least some water; however, that need not be the case. Well 30 also includes a control valve 35 that is controllable—for example, to open or to close, in whole or in part—by the computing system to regulate the amount of water to be injected into the formation 34. A pipe 36 leads to one or more pumps 37 that pump ground water 39 into formation 34 in the direction of arrows 40. A suction pipe 41 may be disposed between the pumps and the ground water. In this example, formation 34 is between bedrock 42 and upper layers, such as sand 43 and soil 44. In some implementations, rather than forcing the ground water directly into an aquifer, the ground water may be forced through rock or sand into a formation reservoir for storage. As explained, the formation reservoir may be free of other materials, such as hydrocarbons. Forcing the water through rock or sand may reduce the levels of impurities contained in the water in some cases.

The water pumped into the formation may be stored for future use. For example, water wells may extract water from reservoirs within the formations. Extraction may be performed during dry periods or at any appropriate time.

Wells within a geographic area may be connected in a sensor-based grid. In some examples, the sensor-based grid uses the GSM (global system for mobile communications) standard to enable communications to and from sensors in different locations. Although GSM is described, any appropriate communications protocol may be used. The sensors may be configured to detect environmental conditions in vicinities of wells using sensors associated with respective wells. The sensors may be configured to detect operational conditions of pumps associated with wells. A computing system may be configured to control operation of the wells, through control of pump operation, valves, or both, based on the conditions.

In an example, one or more sensors may be configured to detect a depth of ground water at a location of a well, and to output, to the computing system, sensor data representing the depth of the water. In this example, the computing system may be configured to control a rate of operation of the one or more pumps based on the depth of the water represented by the sensor data. For example, if the ground water exceeds a predefined depth, the pumps may be controlled to operate faster. In this example, the computing system may be configured to a control valve associated with a respective pump based on the depth of the water represented by the sensor data. For example, if the ground water exceeds a predefined depth, a valve may be opened or opened further to increase the amount of water that can pass through the valve and into the well. For example, if the ground water is below a predefined depth, a valve may be closed, at least partly, to decrease the amount of water that can pass through the valve and into the well.

In an example, one or more sensors may be configured to detect a rate of rainfall at a location of a well, and to output, to the computing system, sensor data representing the rate of rainfall. In this example, the computing system may be configured to control a rate of operation of the one or more pumps based on the rate of rainfall represented by the sensor data. For example, in areas where the rainfall rate exceeds a predefined rate, the pumps may be controlled to operate faster. For example, in areas where the rainfall rate is below a predefined rate, the pumps may be controlled to operate slower than in other areas. In this example, the computing system may be configured to control a valve associated with a respective pump based on the depth of the water represented by the sensor data. For example, if the rate of rainfall exceeds a predefined rate, a valve may be opened to increase the amount of water that can pass through the valve and into the well. For example, if the rate of rainfall is below a predefined rate, a valve may be closed, at least partly, to decrease the amount of water that can pass through the valve and into the well.

In an example, one or more sensors may be configured to detect a temperature at a location of a well, and to output, to the computing system, sensor data representing the temperature. In this example, the computing system may be configured to control a rate of operation of the one or more pumps based on the temperature represented by the sensor data. For example, in areas where the temperature exceeds a predefined value, the pumps may be controlled to operate faster, since higher temperatures may result in faster evaporation and loss of water. For example, in areas where the temperature exceeds the predefined value, a valve may be opened or opened further to increase the amount of water that can pass through the valve and into the well. For example, in areas where the temperature is below a predefined value, a valve may be closed, at least partly, to decrease the amount of water that can pass through the valve and into the well.

In an example, one or more sensors may be configured to detect a wind speed at a location of a well, and to output, to the computing system, sensor data representing the wind speed. In this example, the computing system may be configured to control a rate of operation of the one or more pumps based on the wind speed represented by the sensor data. For example, in areas where the wind speed exceeds a predefined value, the pumps may be controlled to operate faster, since higher wind speeds may result in the spread of flood waters. For example, in areas where the wind speed exceeds the predefined value, a valve may be opened or opened further to increase the amount of water that can pass through the valve and into the well. For example, in areas where the wind speed is below a predefined value, a valve may be closed, at least partly, to decrease the amount of water that can pass through the valve and into the well.

In an example, one or more sensors may be configured to detect a pumping rate of each pump of a well, and to output, to the computing system, sensor data representing the pumping rate. For example, the computing system may be configured to detect the pumping rate based on the sensor data and to change the pumping rate based on factors such as the depth of the ground water, the rate of rainfall, the temperature, and the wind speed.

In an example, one or more sensors may be configured to detect pressure at each pump of a well, and to output, to the computing system, sensor data representing that pressure. In this example, the computing system may be configured to control operation of the pump based on this sensor data. For example, the computing system may be configured to detect the pressure based on the sensor data and to change the pumping rate based on factors such as the depth of the ground water, the rate of rainfall, the temperature, and the wind speed.

In an example, one or more sensors may be configured to the state of a valve, such as whether the valve is opened or closed or the amount that the valve is opened or closed. This information may be output to the computing system and used when changing the state of the valve, as described previously.

In some implementations, any combination of two or more of the preceding sensors may be used in combination at a single well. In some implementations, a single instance of each sensor may be associated with each well, pump, or valve. In some implementations, multiple instances of each sensor or different types of sensors may be associated with each well, pump, or valve. In some implementations, a single instance of a sensor may measure two or more of the previously-described environmental or other parameters. For example, a single sensor may be configured to measure both temperature and wind speed.

Figure 4:
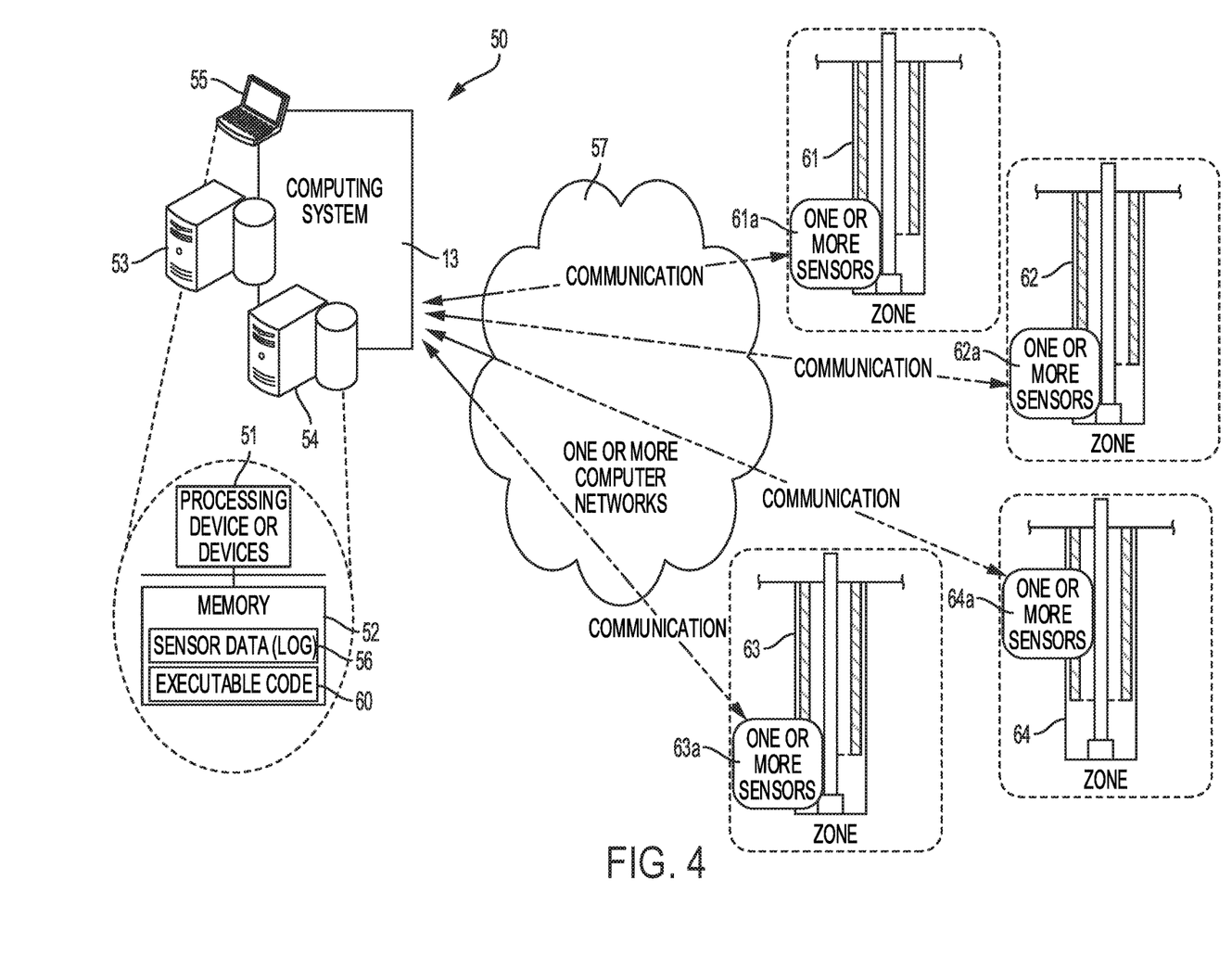
FIG. 4 is a block diagram of an example computing system and various wells.

Examples of computing systems that may be used are described in this specification. Referring to FIG. 4, an example computing system 50 may include one or more processing devices 51 and computer memory 52. The computing system may be located at a single location or distributed, and include multiple devices, such as servers 53 and 54 and computer 55. A laptop is shown in the figure; however, any appropriate computing device may be used. The various sensors communicate with the computing system over one or more computer networks 57.

Communication is represented using dashed lines in the figure, and may be one-way or two-way. In this example, one-way includes communication from the sensors to the computing system, and two-way includes communication from the sensors to the computing system and from the computing system to the sensors. The networks may be wired networks, wireless networks, or a combination of wired and wireless networks. The sensor data 56 may be stored in computer memory to maintain a historical log of water storage, flooding, and other information for a particular geographic area. The sensor data may be updated in real-time to keep the logs up-to-date. In this regard, in some implementations, real-time may include actions that occur on a continuous basis or track each other in time, taking into account delays associated with processing, data transmission, hardware, and the like. The logs may include a record of the amount of water pumped relative to rainfall. This information may be used to determine the real-time effectiveness of site infrastructure and emergency systems in place to deal with flooding.

Memory 52 may also store executable code 60 that contains instructions for coordinating operation of pumps associated with each well based on the environmental conditions detected and information about the operation of each pump or associated valve. Code 60 may be executed to control operation of the pumps or associated valves. Code 60 may receive data from one or more sensors, manage the data, and analyze the data in order to determine ways of controlling the system to reduce flooding impacts and to increase water storage for future use. In this regard, FIG. 4 also shows example wells 61, 62, 63, and 64. In this example, each well 61, 62, 63, and 64 is located in a zone known to accumulate and pool water for reasons explained previously. Each well includes, respectively, one or more sensors 61a, 62a, 63a, or 64a. Each such sensor may be of a type described in this specification. Although the sensors in FIG. 4 are shown in locations that may appear to be downhole, the sensors may be located at any appropriate location, including downhole, uphole, in association or near with a well pump, in association with or near a well valve, or in any appropriate combination of these locations.

In some implementations, meteorological data may be used by code 60 in determining how to control the pumps or associated valves and otherwise allocate system resources. The meteorological data may be real-time data, such as information about current weather in a region, or information about past weather conditions in a region, or information about predicted weather for a region. The meteorological data may be received from any appropriate database or online resource and may be used in addition to, or instead of, the sensor data.

Code 60 may be executed to coordinate operation of the pumps, valves, or both to regulate storage of groundwater within the underground formation and other underground formations. For example, code 60 may control operations of two or more pumps differently based on sensor data received from the two or more pumps or sensor data received from wells associated with the two or more pumps. For example, if the rainfall in a first region is greater than the rainfall in a second region, pumps in the first region may be controlled to operate at a greater rate than pumps in the second region. For example, if the ground water in a first region is at a greater depth than the ground water in a second region, pumps in the first region may be controlled to operate at a greater rate than pumps in the second region. For example, if a rain storm is predicted in a region, pumps in that region may be activated prior to ground water reaching a flooding depth. Similarly, valves may be opened or closed based on factors such as these to regulate the amount of ground water that is permitted to enter the well.

In some implementations, code 60 may be executed to estimate a level of fill of the underground formation, and to control the pumps, valves, or both to force water into parts of the underground formation that are at or below a predefined level of fill. For example, two pumps may be located in a same flood zone. The two pumps may extend to different formations that are filled to different levels. Code 60 may obtain geologic information about the fill levels of the different formations from any appropriate sources, and determine which of the formations has more unused capacity. Code 60 may be executed to control the pump that extends to the formation having more unused capacity to operate at a greater rate than the pump that extends to the formation having less unused capacity. Code 60 may also control operation of the valves to permit more or less water flow.

In some implementations, geologic information may identify pathways and connections between underground formations that are capable of storing ground water pumped from the surface. Code 60 may be executed to control the operation of pumps to pump ground water into one formation knowing that the ground water will flow underground to another formation for storage. For example, pumps that extend to wells to connected formations may be controlled to operate at a greater rate, and for a longer period of time, than pumps that extend to formations that have more limited potential storage capacity for ground water.

In some implementations, one or more water-carrying conduits may connect two or more of the wells. An example of such conduits include a pipeline or portions of a pipeline. The conduits may be connected to pumps at one or both wells to move water from a first location to a second location for storage in an underground formation at, above, or in the vicinity of, the second location. For example, the pumps controlled in the grid system may be used to distribute water to the areas with less rain fall. Code 60 may be executed to control a pump at the first location to transport water through a conduit from a first well at the first location to a second well at the second location. A pump at the second location may direct the water through the second well at the second location and into an underground formation for storage. In some implementations, the conduits may transport water over larger geographic areas—for example, tens or hundreds of kilometers. In some implementations, the conduits may transport water over smaller geographic areas—for example, meters or tens of meters. To the extent necessary, intermediary pumping mechanisms may be used to force the water along a path. In some implementations, the conduits may be gravity-assisted in that they may have a slight downslope allowing water entering the conduits to flow naturally.

In some implementations, code 60 may be executed to control pumps to compensate for a loss of a wells' ability to inject water into a formation and also to highlight remedial work needed to keep the system at full efficiency. For example, sensors at a pump of a well may be configured to detect pressure at the well. Greater pressure in a well indicates that greater force is required to force water through the well and into an underground formation. In some implementations, after detecting pressure above a threshold, code 60 may be executed to increase the rate of operation of the pump. In some implementations, after detecting pressure above a threshold, code 60 may be executed to stop operation of the pump. For example, if the pressure is great enough, this may indicate that the underground formation cannot store any additional ground water. In this example, code 60 may be executed to increase the rate of operation of one or more pumps in the vicinity of the stopped pump in order to do the work of the pump that is now stopped.

Figure 5:
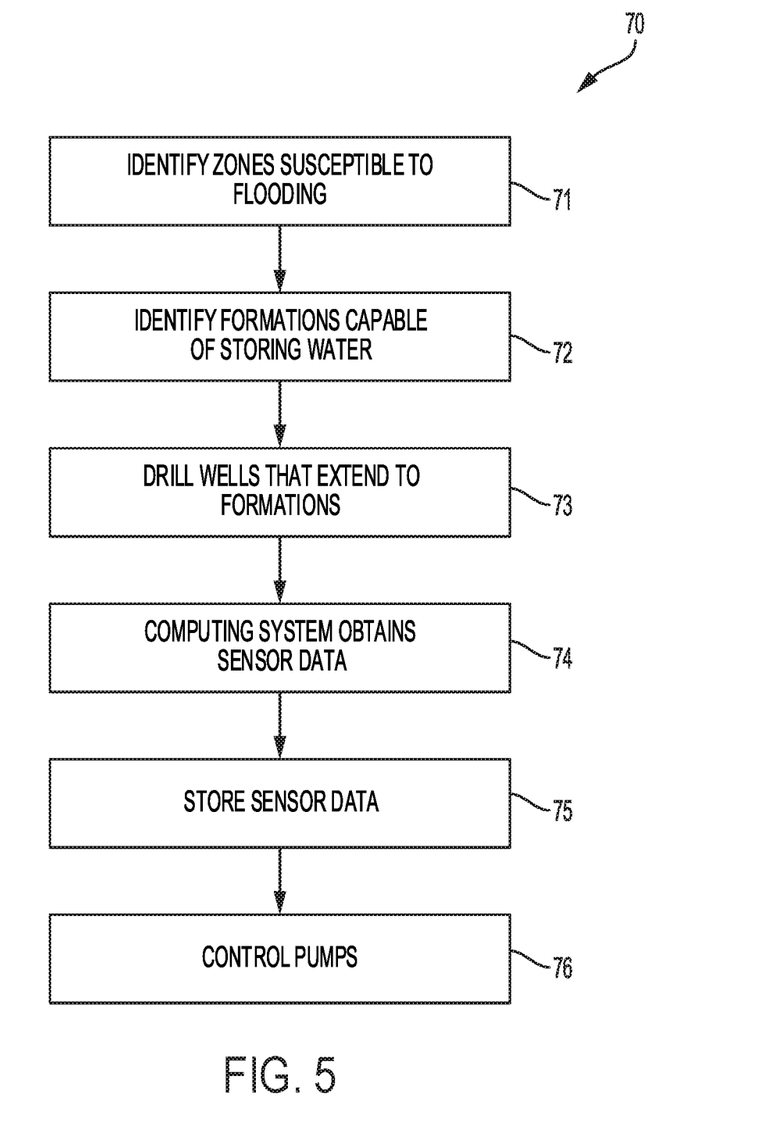
FIG. 5 is a flow diagram of an example process for controlling pumps of wells to coordinate operation of the pumps.

FIG. 5 is a flowchart that includes operations 70 that may be performed by the sensor-based grid system described in this specification. The operations may be performed, at least in part, through execution of code 60 on computing system 50, and through communications to and from sensors associated with wells and pumps. Communications from the sensors may include the sensors sending information, such as sensor data, to the computing system periodically, intermittently, sporadically, or at any appropriate time. Communications to the sensors may include the computing system querying the sensors for information, such as sensor data, periodically, intermittently, sporadically, or at any appropriate time.

According to the operations of FIG. 5, zones that are susceptible to flooding, or to having standing ground water for any given reason, are identified (71). As explained previously, these zones may be identified based on historical data, weather patterns, or any other appropriate information. The zones may be in residential areas, non-residential areas, rural areas, urban areas, or any other appropriate location. The zones may be adjacent or distributed, and may be across any appropriate geographic expanse. Formations under the zones or accessible via wells drilled in the zones are identified (72). As explained previously, these formations may be identified based on known geological information, prior drilling experiences, geological surveys or scans, or any other appropriate information. Examples of these formations include, but are not limited to, lost circulation zones and aquifers. More than one formation may be associated with a single zone, or more than one zone may be associated with a single formation. For example, wells from a single zone may be drilled to more than one formation; or wells from multiple zones may be drilled to a single formation. In some cases, a single well from a single zone may be drilled for water storage to a single formation.

Following identification of one or more zones and one or more formations, wells are drilled (73) at appropriate locations. Examples of wells that may be drilled are described previously. In some examples, the wells are drilled at low or lowest elevations within a particular zone. In some implementations, if a single zone is hilly and includes multiple areas of low elevation where water may pool, multiple wells may be drilled for a single zone—one for each low-lying area. In some implementations, the number and locations of wells may be based on the volume of water expected to pool in a zone. For example, if the volume is such that it cannot be evacuated by a single pump in a predefined amount of time, multiple wells may be used or pumps that have greater capacity may be used.

The computing system obtains (74) sensor data such as, but not limited to, a depth of water at a location of a well, a rate of rainfall at the location of the well, a temperature at the location of the well, a wind speed at the location of the well, pump capacity at a location of the well, and the operational state of one or more well valves. Based on all or some this information, the computing system controls the pumps, values, or both the pumps and the valves at one or more of wells to operate and, in the case of the pumps, the rate at which they operate. Information such as meteorological data, the locations and capacities of aquifers, environmental considerations, and the ability to move ground water via one or more conduits also may be taken into consideration when determining when, how, and for how long to operate various pumps or valves. Information about the operation of the pump, the water removed, and the weather may be stored (75) in computer memory, and that information may be updated in real-time, as appropriate.

In some implementations, the sensor-based grid system described in this specification is configured to operate automatically. Automatic operation includes, for example, normal operation absent human intervention or initiation. For example, upon detecting flood conditions in a particular location, code 60 may execute automatically to control (76) pumps in that area to operate, and to operate at a particular rate, in order to remove ground water from the location and to store the ground water in an underground formation. Code 60 may continue execution to coordinate operations of the pumps in that location and in other locations based on factors, such as those described in this specification, to increase (for example, to maximize) storage of ground water underground and to reduce flooding above ground. Automatic operation does not exclude human intervention in the case of system error, such as a crash of the computing system or a physical malfunction of a pump.

All or part of the system and processes described in this specification and their various modifications (subsequently referred to as "the processes") may be controlled at least in part, by one or more computers using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with controlling the processes can be performed by one or more programmable processors executing one or more computer programs to control all or some of the well formation operations described previously. All or part of the processes can be controlled by special purpose logic circuitry, such as, an FPGA (field programmable gate array), an ASIC (application-specific integrated circuit), or both an FPGA and an ASIC.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:
    wells, each well being between a surface and an underground formation capable of storing water received from the surface;
    pumps, at least one pump being associated with each well to force water from the surface, through the well, into the underground formation;
    sensors, at least one sensor being associated with each well, the sensors being configured to communicate sensor data wirelessly; and
    a computing system configured to receive sensor data from each of the sensors and to control operations of one or more of the pumps based on the sensor data,
    where at least some of the sensors are located near at least one of a well pump and a well valve on the ground surface, and configured to detect a temperature at a location of a well, the sensor data representing the temperature,
    where the computing system is configured to receive meteorological data, and to control operations of one or more of the pumps based on the meteorological data, and
    where the computing system is further configured to execute a code to estimate a level of fill of the underground formation, and to control one or more of the pumps to force water into parts of the underground formation that are at or below a predefined level of fill.
2. The system of claim 1, where at least some of the sensors are located downhole and are configured to detect a depth of water at a location of a well, the sensor data representing the depth of the water;
    where the computing system is further configured to control a rate of operation of the pumps based on the sensor data,
    where the wells are within a geographic area and are connected in a sensor-based grid, and
    where the sensor-based grid uses a communications protocol to enable communications to and from the sensors in different locations.
3. The system of claim 1, where the sensors are configured to detect a rate of rainfall at a location of a well, the sensor data representing the rate of rainfall; and
    where the computing system is configured to control a rate of operation of the pumps based on the sensor data.
4. The system of claim 1,
    where the computing system is configured to control a rate of operation of the pumps based on the sensor data.
5. The system of claim 1, where the sensors are configured to detect a wind speed at a location of a well, the sensor data representing the wind speed, at least one sensor located at the surface; and
    where the computing system is configured to control a rate of operation of the pumps based on the wind speed.
6. The system of claim 1, where the computing system is configured to control a rate of operation of one or more of the pumps to pump water at greater rates for wells that are subjected to greater rates of rainfall than for wells that are subjected to lesser rates of rainfall,
    where a code is executed to control a first pump that extends to the underground formation to operate at a greater rate than a second pump that extends to the underground formation,
    where the first pump that extends to the underground formation has more unused capacity than the second pump that extends to the underground formation,
    where the sensors at the well pump are configured to detect a pressure at the wells, and
    where the code is executed to stop operation of the one of more of the pumps upon detecting the pressure at the wells above a threshold.
7. The system of claim 1, where the underground formation comprises a lost circulation zone; and
    where the computing system is configured to identify the lost circulation zone based on geological data representing at least an area of the lost circulation zone.
8. The system of claim 7, where the computing system is configured to control operations of two or more pumps differently based on pump sensor data received from the two or more pumps or sensor data received from wells associated with the two or more pumps, and
    where at least some of the sensors are configured to detect a rate of rainfall at a location of a well, the sensor data representing the rate of rainfall.
9. The system of claim 8, where the computing system comprises memory and one or more processing devices, the one or more processing devices being configured to store, in memory, a record of water pumped for each well and a record of rainfall in a vicinity of each well, and
    where the computing system is configured to control a rate of operation of the pumps based on the sensor data representing the rate of rainfall.
10. The system of claim 7, where the computing system and the sensors define a grid over an area containing the wells;
    where controlling operation of pumps within the grid comprises coordinating operation of the pumps to regulate storage of groundwater within the underground formation and other underground formations,
    where the area is localized, and
    where the area spans 1000 square kilometers.

11. The system of claim 1, further comprising:
one or more conduits between two or more of the wells, the one or more conduits being connected to one or more of the pumps and being configured to transport water over a geographic area; and
where the computing system is configured to control a pump to transport water through a conduit from a first well to a second well,
where the one or more conduits transport water over meters, tens of meters, tens of kilometers, or hundreds of kilometers.

12. The system of claim 1, further comprising:
one or more nested casing segments,
where each downhole casing segment is suspended from an immediately-preceding uphole casing segment.

13. A system comprising:
wells, each well being between a surface and an underground formation capable of holding water received from the surface;
pumps, at least one pump being associated with each well to force water from the surface, through the well, into the underground formation;
sensors, at least one sensor being associated with each well, the sensors being configured to communicate sensor data wirelessly; and
a computing system configured to receive sensor data from each of the sensors and to control operations of the pumps based on the sensor data,
where at least some of the sensors are configured to detect a rate of rainfall at the location of a well, the sensor data representing the rate of rainfall;
where the computing system is configured to control a rate of operation of the pumps based on the sensor data representing the rate of rainfall;
where controlling a rate of operation of the pumps comprises selectively adjusting at least one of the speed and output while the pumps are in operation;
where the computing system is configured to estimate a level of fill of the underground formation, and to control the pumps to force water into parts of the underground formation that are at or below a predefined level of fill, and
where a suction pipe is disposed between the pumps and the ground water.

14. A method comprising:
detecting environmental conditions in vicinities of wells using sensors associated with respective wells, each well being between a surface and an underground formation capable of storing water received from the surface;
coordinating operation of pumps associated with respective wells based on the environmental conditions detected, each pump being configured to force water from a surface, through a well, to an underground formation;
executing a code to estimate a level of fill of the underground formation; and
executing the code to control a first pump that extends to the underground formation to operate at a greater rate than a second pump that extends to the underground formation,
where operation of the pumps is coordinated to control a rate of operation of one or more of the pumps to pump water at greater rates for wells that are subjected to a greater depth of water than for wells that are subjected to a lesser depth of water, and
where controlling a rate of operation of one or more of the pumps comprises selectively adjusting at least one of the speed or output while the pumps are in operation,
where the first pump comprises more unused capacity than the second pump, and
where operation of the pumps is coordinated to control one or more of the pumps to force water into parts of the underground formation that are at or below a predefined level of fill.

15. The method of claim 14, where the environmental conditions comprise a depth of water at a location of a well; and
where coordinating operation of pumps comprises controlling a rate of operation of one or more pumps based on the depth of water.

16. The method of claim 14, where the environmental conditions comprise a rate of rainfall at a location of a well; and
where coordinating operation of pumps comprises controlling a rate of operation of one or more pumps, where each pump forces water from the surface, through the well, to the underground formation based on the rate of rainfall.

17. The method of claim 14, where the environmental conditions comprise a temperature at a location of a well; and
where coordinating operation of pumps comprises controlling a rate of operation of one or more pumps based on the temperature.

18. The method of claim 14, where the environmental conditions comprise a wind speed at a location of a well; and
where coordinating operation of pumps comprises controlling a rate of operation of one or more pumps based on the wind speed.

19. The method of claim 14, where the environmental conditions comprise one or more of the following: a depth of water at a location of a well, a temperature at the location of the well, and a wind speed at the location of the well; and
where coordinating operation of pumps comprises controlling a rate of operation of one or more pumps based on one or more of the following: the depth of water at the location of the well, the temperature at the location of the well, and the wind speed at the location of the well.

20. The method of claim 14, where the underground formation comprises a lost circulation zone; and
where the method further comprises identifying the lost circulation zone based on geological data representing at least an area of the lost circulation zone.

21. The method of claim 20, where operation of the pumps is coordinated to force water through one or more conduits between two or more of the wells.

22. The method of claim 14, where operation of the pumps is coordinated also based on the meteorological data for vicinities of the pumps.

23. The method of claim 14, further comprising storing, in computer memory, a record of water pumped for each well and a record of rainfall in a vicinity of each well.

24. The method of claim 14, further comprising:
executing the code to stop operation of the one of more of the pumps after detecting a pressure above a threshold, where sensors at a well pump are configured to detect the pressure at the wells.

* * * * *